US008286892B1

(12) United States Patent
Schwanebek

(10) Patent No.: US 8,286,892 B1
(45) Date of Patent: Oct. 16, 2012

(54) WATER HOSE SUPPORT APPARATUS

(76) Inventor: Glen Schwanebek, Deland, FL (US)

( * ) Notice: Subject to any disclaimer, the term of this patent is extended or adjusted under 35 U.S.C. 154(b) by 107 days.

(21) Appl. No.: 13/012,478

(22) Filed: Jan. 24, 2011

(51) Int. Cl.
*A01G 25/00* (2006.01)
*B05B 15/06* (2006.01)

(52) U.S. Cl. ............ 239/1; 239/276; 239/280; 239/281; 248/75; 248/85; 248/87

(58) Field of Classification Search .............. 239/1, 273, 239/276, 280, 280.5, 281; 248/74.1, 74.3, 248/75, 76, 80, 85–88
See application file for complete search history.

(56) References Cited

U.S. PATENT DOCUMENTS 2,349,505 A * 5/1944 Lohne ............ 248/85
2,480,906 A * 9/1949 Cox ............ 248/88
2,530,873 A * 11/1950 Grotz ............ 248/76
2,657,096 A * 10/1953 Holmes ............ 239/276
3,119,587 A * 1/1964 Anderson ............ 248/75
3,473,770 A 10/1969 Edgerton
3,823,905 A 7/1974 Ray
D245,556 S 8/1977 Meyer
4,063,767 A 12/1977 Hardin
4,135,668 A * 1/1979 Winkler et al. ............ 239/276
D281,221 S 11/1985 Edmiston
D290,809 S 7/1987 Elliott
D306,681 S 3/1990 Toca, III
D309,242 S 7/1990 Laslo
D334,529 S 4/1993 Guilbert
D397,405 S 8/1998 Smith
D596,480 S 7/2009 Murphy
2005/0184203 A1 * 8/2005 Votypka ............ 248/87

* cited by examiner

*Primary Examiner* — Darren W Gorman
(74) *Attorney, Agent, or Firm* — Gold & Rizvi, P.A.; Glenn E. Gold; H. John Rizvi

(57) ABSTRACT

A hose holder assembly comprising a hose holder member being attached to an elongated hose holder support member. The hose holder member includes a tubular body having a passage therethrough for receiving a garden hose. The length of the body is sufficient to maintain the garden hose in a fixed position when subjected to forces resulting from a discharging flow of water. A body coupler section is provided for assembling the body to the support member. The coupler can be a male or female form factor. A utility hook can be included as a feature of the hose holder member for temporarily holding tools or other items. The body can be segmented into a fixed portion, which is attached to the support member and a removable portion, which removably engages with the fixed portion. A sizing sleeve can be offered to reduce a passage diameter for receiving hoses having smaller diameters.

18 Claims, 6 Drawing Sheets

WATER HOSE SUPPORT APPARATUS

FIELD OF THE INVENTION

The present disclosure generally relates to an apparatus and method for holding a garden hose. More particularly, the present disclosure relates to a tubular member affixed in a horizontal orientation to a top end of a vertically oriented support member, wherein a garden hose is inserted through the hollow interior of the tubular member maintaining the hose in an operative position.

BACKGROUND OF THE INVENTION

A number of water hose supports are known. Each of these known supports is directed towards a means for temporarily maintaining a garden hose in an operative position for watering a flora. The hose support member maintains the hose in an operative position proximate the ground.

Many conventional hose supports are difficult to engage with and disengage from the hose body and may result in its damage, particularly if the hose is of the relatively thin walled, inexpensive garden hose type. Much time may be lost in fixing the support in place and in removing it when the hose is needed for other purposes. Moreover, certain of such devices are relatively complicated and expensive to make and repair. Others of such devices are solely adapted to engage hose nozzles of certain sizes and shapes and are not capable of operating when a different type of attachment is connected to the hose to be suspended therewith above ground level.

A first known water hose support generally comprises an elongated ground-engaging spike to one end of which is attached a wire or bracket adapted to grip the hose, leaving the hose attachment, such as a nozzle or the like, to hang free. Such devices do not provide positive support for the attachment. Accordingly, the attachment angle relative to the ground may shift depending on the water pressure in the hose and the consequent stiffness of the hose.

A second known water hose support comprises a guide member, which is disposed upon an upper end of a support member. The guide member is fabricated from a shaped having a pair of upstanding wings, each comprising an aperture therethrough. The apertures are sized and positioned to accept and temporarily secure a garden hose placed therethrough. The wings are bendable allowing the user to adjust the wing's angle of inclination. The wings are fabricated of a planar material.

A third known water hose support comprises a tubular section disposed upon an upper end of a support member. The tubular member comprises a male hose coupler disposed upon a first end and a female hose coupler disposed upon a second end. The hose is attached to the female coupler. A nozzle is connected to the male coupler. This apparatus is cumbersome to use, particularly when the water supply is turned on, as the nozzle has to be removed from the hose to configure the holder.

Another known garden hose holder is fabricated by forming a wire into a coil having two parallel legs extending from each end. The hose is inserted between two adjacent turns of the coil. The apparatus is limited in that the coil turns apply a compression force to the garden hose. Inserting the hose between two adjacent coils may be difficult.

Another known garden hose holder utilizes a shaped section of tubing including a formed "M" shaped hose support section. The hose is simply placed into the central "V" portion of the "M". This support apparatus may allow the hose to dislodge during use as a result from the forces created by the flowing water.

Yet, another known garden hose holder is provided in a shape of a pair of hinged tongs, each tong having a handle section provided on a first end and a pair of clamping sections provided proximate a second end. The user secures the garden hose within the pair of clamping sections and manipulates the direction of the hose to water flora. This apparatus is limited in that the design requires the individual to hold the device during use.

When an individual finishes working on something outside, such as cleaning, maintaining, or repairing a vehicle; yard work; and the like, the individual would prefer to clean up prior to going inside the residence. This is commonly accomplished by using hand cleaner and water, wherein a garden hose supplies the water. The individual needs to wash their hands, arms, feet, legs, and other parts of their body, while holding the hose in an operative position. The individual can resort to holding the hose with their hands, between their knees or using any other manual means which is generally less than optimal. Additionally, a similar scenario occurs when bathing pets. If the individual is required to hold the hose, that restricts the use of one of two of the individual's hands.

Accordingly, there is a need for a simple, durable, inexpensive water hose attachment holder capable of efficiently functioning with a wide variety of hose attachments. Such device should be easy and rapid to install and remove and preferably should positively engage the attachment to hold it in any desired position regardless of the water pressure in the hose. It is desirable to provide a hose holder designed to aid an individual in washing items including themselves, pets, and the like.

SUMMARY OF THE INVENTION

The present disclosure is generally directed to an apparatus and respective method of use for holding a running garden hose to aid an individual in washing their hands and other objects.

The present invention is a garden hose holder comprising:

an elongated rigid support member having a lower end in the form of a ground penetrating stake, and a nozzle holder engagement coupling section defined at an upper end, and a unitary T-shaped hose nozzle holder having a vertical segment adapted for engagement with said elongated rigid support member, and an adjoining horizontal rigid tube segment having an interior surface defining a uniform interior diameter, the interior surface adapted for engagement with the hose nozzle;

wherein the T-shaped hose nozzle holder vertical coupling segment is attached to the nozzle engagement coupling section.

In another aspect, the hose holder body coupler section can be provided having a female coupler form factor having an interior diameter that forcibly engages with an exterior diameter of the elongated support member.

In yet another aspect, the elongated support member is formed of a length of tubular material.

In yet another aspect, the upper hose nozzle support end is defined by an annular upper surface joining interior and exterior tube surfaces, an upper length of the rigid tube having a uniform interior diameter In yet another aspect, the hose holder body coupler section can be provided having a male coupler form factor having an exterior diameter that forcibly engages with an interior diameter of a hollow elongated support member.

In yet another aspect, the elongated tubular body section further comprises a first end wall and an opposite second end wall, each end wall having a perpendicular relation with a longitudinal axis of the elongated tubular body section.

In yet another aspect, a utility hook can be incorporated into the hose holder assembly. The utility hook is provided to temporarily hold tools such as rakes, spades, bags, gloves, and the like.

In yet another aspect, a passage sizing sleeve can be provided to adjust an interior diameter of the hose holder passage. The passage sizing sleeve is fabricated of a resilient material and shaped having a tubular sleeve body with a sleeve end flange extending outward from each end thereof.

In yet another aspect, an alternate embodiment provides a hose holder body having a removable body member and a fixed body member.

In yet another aspect, a releasable engaging interface is provided the removable body member and a fixed body member.

In yet another aspect, the present invention discloses a method for temporarily positioning and fixing an orientation of a garden hose nozzle above the ground to facilitate use of running water from the hose for hand washing, the method comprising the steps:

providing a hose nozzle holder assembly, said holder assembly comprising:

an elongated rigid support member having a lower end in a form of a ground penetrating stake, and a nozzle holder engagement coupling section defined at an upper end, and a unitary T-shaped hose nozzle holder having a vertical segment adapted for engagement with said elongated rigid support member, and an adjoining horizontal rigid tube segment having an interior surface defining a uniform interior diameter, said interior surface adapted for engagement with said hose nozzle, wherein said T-shaped hose nozzle holder vertical coupling segment is attached to said nozzle holder coupling section;

driving said ground-penetrating stake end of said elongated rigid tube into said ground such that said elongated rigid support member is oriented vertically and said horizontal segment of said unitary T-shaped hose nozzle holder is oriented horizontally; and inserting said hose nozzle through said horizontal rigid tube segment such that an exterior surface of said hose nozzle remains in frictional engagement with said interior surface of said horizontal rigid tube segment, thereby maintaining said hose nozzle in an orientation horizontally, wherein, the maintenance of said hose nozzle in a fixed position enables hands-free use of discharging water.

In yet another aspect, the method further comprises a step of attaching a nozzle to the garden hose discharge end.

In yet another aspect, the method further comprises a step of placing a tool onto a utility hook, wherein the utility hook is included in the hose holder assembly.

These and other aspects, features, and advantages of the present invention will become more readily apparent from the attached drawings and the detailed description of the preferred embodiments, which follow.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms “upper”, “lower”, “left”, “rear”, “right”, “front”, “vertical”, “horizontal”, and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
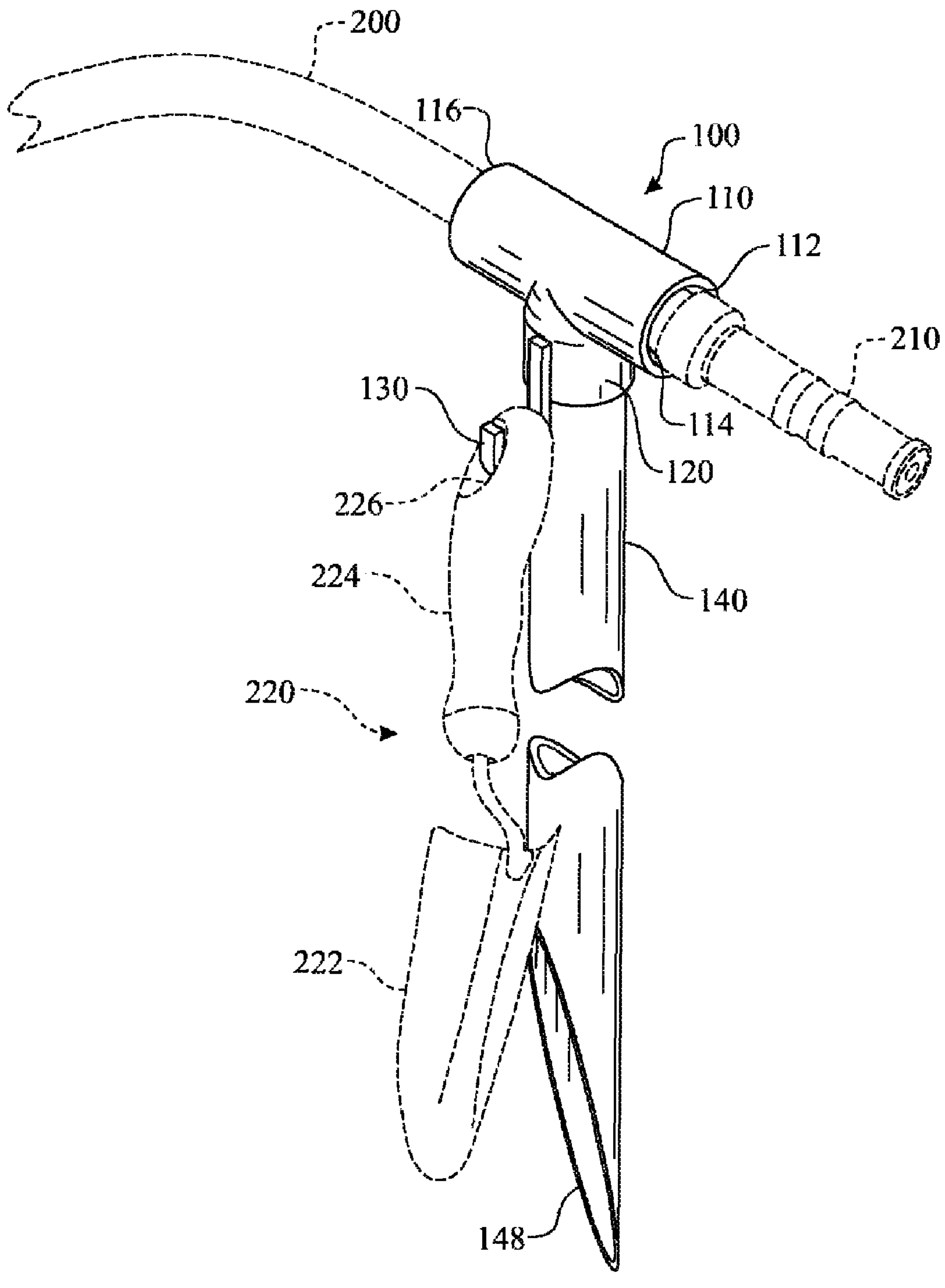
FIG. 1 presents an isometric view of a first exemplary hose holder assembly comprising a unitary T-shaped hose nozzle holder attached to an elongated rigid support member.
Figure 2:
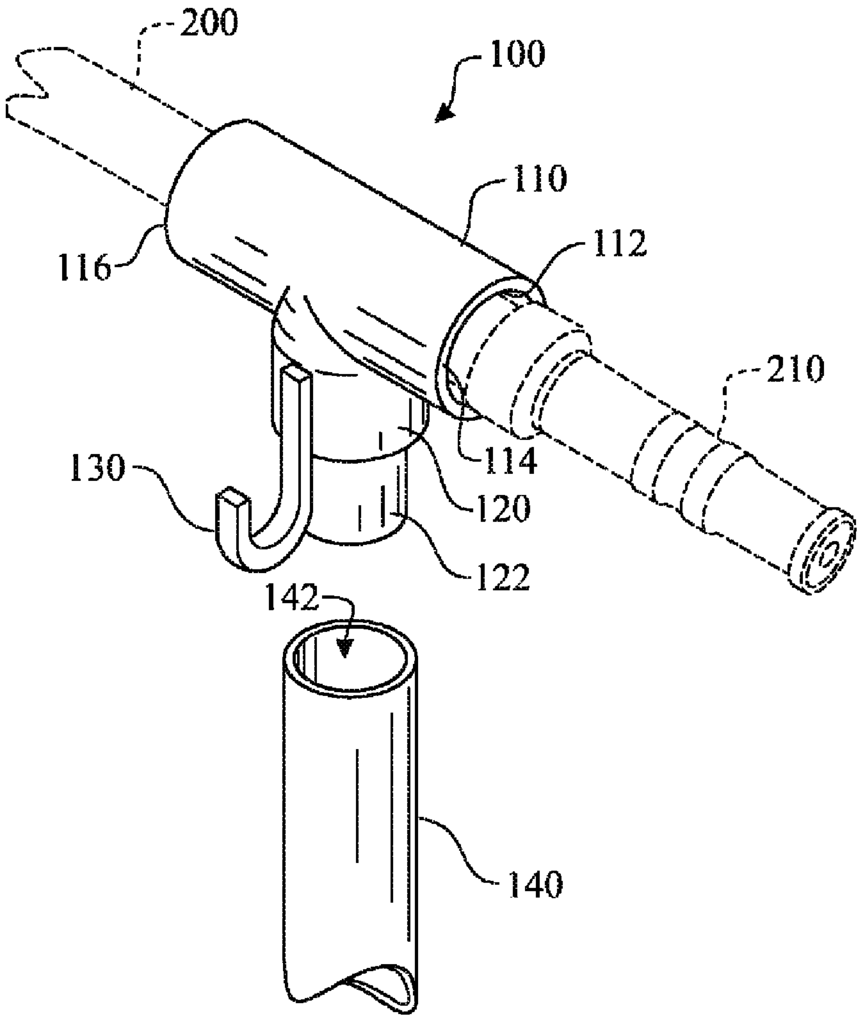
FIG. 2 presents an exploded assembly isometric view of the hose holder assembly originally presented in FIG. 1.
Figure 3:
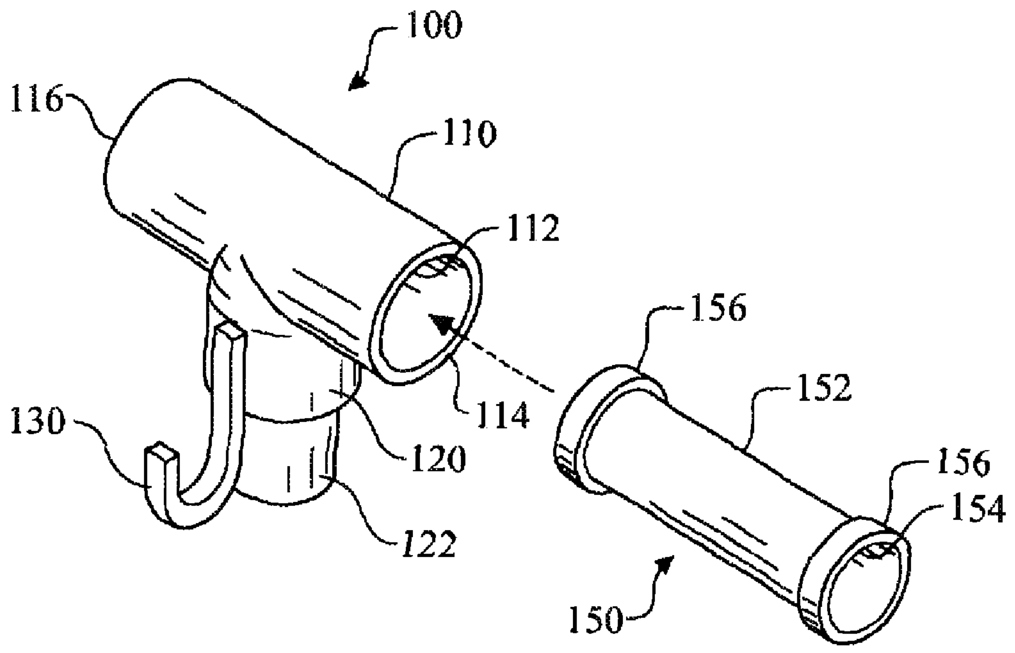
FIG. 3 presents an isometric view of the hose holder introducing a passage sizing sleeve.

A hose holder assembly includes a unitary T-shaped hose nozzle holder 100 assembled upon an upper distal end of a elongated rigid support member 140, wherein the hose holder assembly maintains a garden hose 200 in an operative position as illustrated in FIGS. 1 and 2. The unitary T-shaped hose nozzle holder 100 is segmented into two functioning sections: a horizontally arranged rigid tube segment 110 and a vertically arranged T-shaped hose nozzle holder vertical coupling segment 120. The rigid tube segment 110 is shaped including an elongated tubular member, preferably having a cylindrically shape. The rigid tube segment 110 forms a tubular passage defined a rigid tube segment interior surface 112. The rigid tube segment interior surface 112 terminates between a first passage end wall 114 located at a first end, and a second passage end wall 116 located at an opposite end. A length of the rigid tube segment 110 is defined by a distance between the first passage end wall 114 and the second passage end wall 116. The length is sufficient to maintain the garden hose 200 in a fixed position when subjected to forces resulting from a discharging flow of water. The length of the rigid tube segment 110 can be at least 2", at least 2.25", at least 2.5", at least 3", and the like. A nozzle holder coupler adapter 122 extends linearly from the T-shaped hose nozzle holder vertical coupling segment 120. The T-shaped hose nozzle holder vertical coupling segment 120 can be a male coupling form factor (as illustrated), which is inserted into a support member hollow interior 142 of the elongated rigid support member 140 or a female coupling form factor, which receives a distal end of the elongated rigid support member 140. The preferred embodiment is shown including the nozzle holder coupler adapter 122 and wherein an external diameter of the T-shaped hose nozzle holder vertical coupling segment 120 is proximate or equal to an external diameter of the elongated rigid support member 140, creating a smooth contiguous surface when the unitary T-shaped hose nozzle holder 100 is assembled to the elongated rigid support member 140.

The unitary T-shaped hose nozzle holder 100 is preferably fabricated of an injected a vinyl polymer material, such as polyvinyl chloride, commonly abbreviated PVC. The elongated rigid support member 140 is preferably fabricated of an elongated section of PVC piping. The upper, nozzle holder engagement coupling section includes an attachment edge, which creates a plane that is perpendicular to a longitudinal axis of the elongated rigid support member 140. A ground-penetrating stake 148 is provided on an opposite end of the elongated rigid support member 140. The ground-penetrating stake 148 is shaped by cutting the elongated rigid support member 140 along a plane forming an acute angle to the longitudinal axis of the elongated rigid support member 140.

Figure 5:
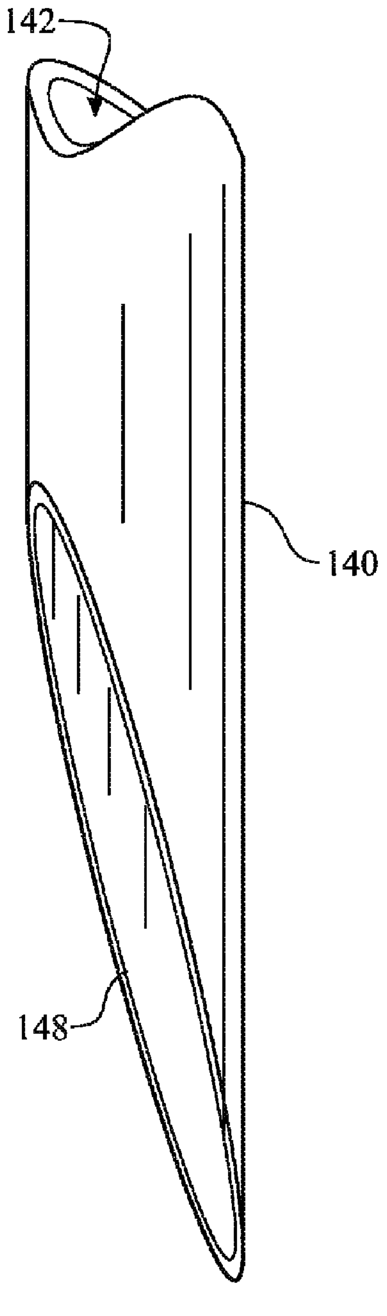
FIG. 5 presents an exploded view of a ground penetrating end of the elongated hose holder support member.

The user inserts the ground-penetrating stake 148 into a ground, the insertion process being assisted by the reduced resistance from the angular arrangement of the ground-penetrating stake 148 (detailed in FIG. 5) and the hollow central section of the elongated rigid support member 140. The rigid tube segment 110 provides a comfortable aid for applying an insertion force into the assembly. Inserting the ground-penetrating stake 148 into the ground supports the elongated rigid support member 140 in an upright orientation, placing the rigid tube segment 110 at a desired height.

An individual using a garden hose 200 commonly secures a nozzle 210 onto an end of the garden hose 200. The nozzle 210 is used to control a discharge rate, pressure, and stream width of water from the garden hose 200. The nozzle 210 (or a free end of the garden hose 200) is inserted through a rigid tube segment passage defined by the rigid tube segment interior surface 112. The insertion process passes the nozzle 210 across the second passage end wall 116 and exiting the first passage end wall 114. The coupling end of the nozzle 210 forms a flange, which can be positioned against the first passage end wall 114. This maintains the nozzle 210 in a positional relation with the unitary T-shaped hose nozzle holder 100.

A utility hook 130 can be provided as a component of the unitary T-shaped hose nozzle holder 100. The utility hook 130 can be a molded component thereof, separately formed and subsequently attached thereto, and the like. The utility hook 130 provides a means for temporarily holding a tool, gloves, or other objects. A garden tool 220 is presented as an exemplary item being temporarily held by the utility hook 130. The garden tool 220 includes a garden spade blade 222 extending from a garden spade handle 224. A handle aperture 226 is provided through a distal end of the garden spade handle 224. The utility hook 130 is inserted through the garden spade handle 224, holding the garden tool 220 in location.

Hoses 200 have several different standard diameters. A passage sizing sleeve 150 is included to adapt the rigid tube segment interior surface 112 for receiving and maintaining hoses 200 of different diameters. The passage sizing sleeve 150 is fabricated of a resilient material and shaped having a tubular sleeve body 152 with a sleeve end flange 156 extending outward from each end thereof. A sleeve passage 154 is provided through an interior of the tubular sleeve body 152. The outer diameter of the tubular sleeve body 152 is approximate or equal to the inner diameter of the rigid tube segment interior surface 112. The passage sizing sleeve 150 is inserted through the rigid tube segment interior surface 112 by applying pressure to the resilient sleeve end flange 156 to reshape the flange 156 to fit through the rigid tube segment interior surface 112. The passage sizing sleeve 150 is then slid through the rigid tube segment interior surface 112 positioning each sleeve end flanges 156 external to the rigid tube segment interior surface 112, thus securing the passage sizing sleeve 150 within the rigid tube segment interior surface 112.

Figure 4:
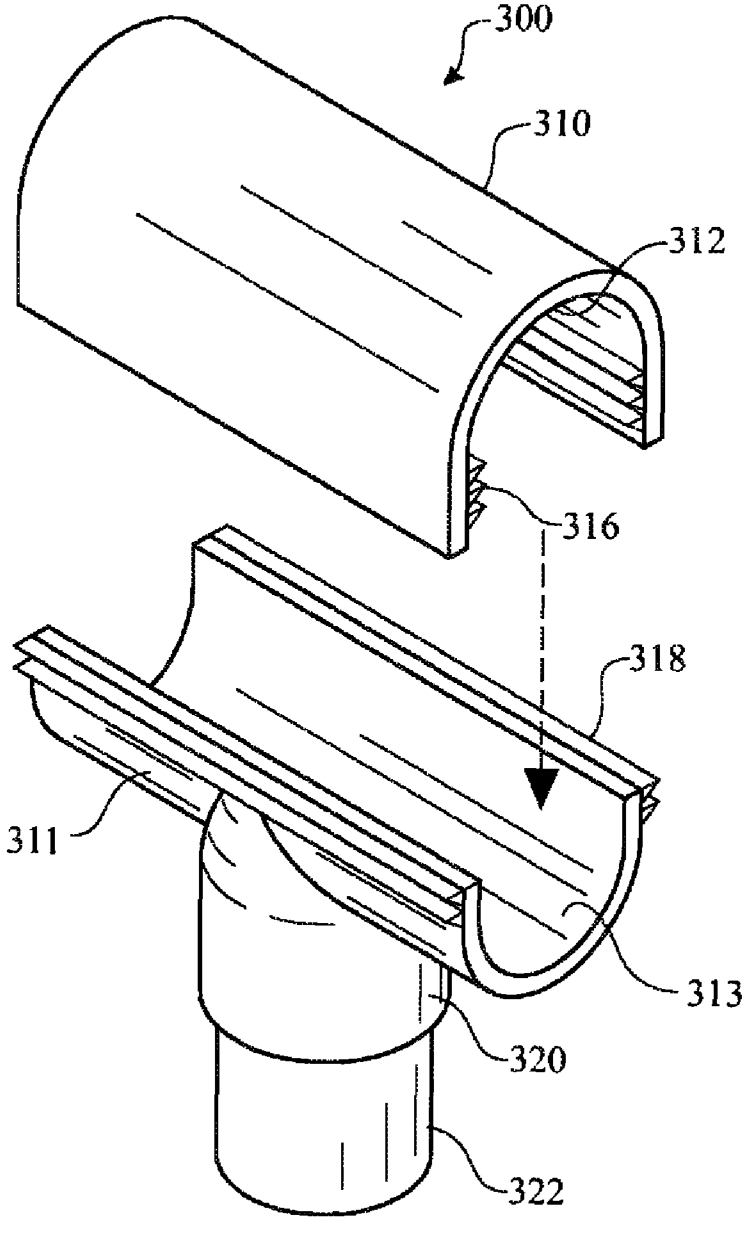
FIG. 4 presents an isometric view of a second exemplary hose holder assembly comprising a hose holder member sectioned into a fixed body member and a removable body member.

A second embodiment provides a two-piece version of the unitary T-shaped hose nozzle holder 100; referred to as a two-piece hose holder assembly 300 and illustrated in FIG. 4. The two-piece hose holder assembly 300 is fabricated having a hose holder fixed segment 311, which has a unitary, perpendicular arrangement with a hose holder body coupler head 320, and a hose holder removable member 310, which removably engages to the hose holder fixed segment 311. The hose holder removable member 310 includes a hose holder coupler adapter 322, wherein the hose holder coupler adapter 322 is similar to the nozzle holder coupler adapter 122 of the unitary T-shaped hose nozzle holder 100. The hose holder fixed segment 311 is formed having a "U" cross sectional shape, creating a fixed passage section 313. The hose holder removable member 310 is also formed having a "U" cross sectional shape, creating a removable passage section 312. The hose holder removable member 310 is removably secured to the hose holder fixed segment 311 by any reasonable means known by those skilled in the art. An exemplary embodiment illustrated in FIG. 4 utilizes a plurality of removable body member assembly interfaces 316 provided on an interior surface of the hose holder removable member 310 and a mating plurality of fixed body member assembly interfaces 318 provided on an exterior surface of the hose holder fixed segment 311. The exemplary assembly interface 316, 318 utilizes a series of longitudinally arranged ridges and slots. The user compresses the hose holder removable member 310 onto the hose holder fixed segment 311. This force causes ends of the hose holder removable member 310 to flex outward, allowing the removable body member assembly interface 316 to snap over the respective fixed body member assembly interface 318. When assembled, the removable passage section 312 and fixed passage section 313 combine to form a passage similar to the rigid tube segment interior surface 112 of the rigid tube segment 110 described above. The hose holder removable member 310 can be removed by flexing an edge of the hose holder removable member 310 outward, releasing the interface formed between the removable body member assembly interface 316 and the fixed body member assembly interface 318. Alternately, the hose holder removable member 310 can be removed by sliding the hose holder removable member 310 in a direction parallel to the assembly interface 316, 318. Although the exemplary embodiment illustrates the assembly interface 316, 318 as a series of longitudinally arranged ridges and slots, it is understood that any assembly interface form factor can be utilized.

Figure 6:
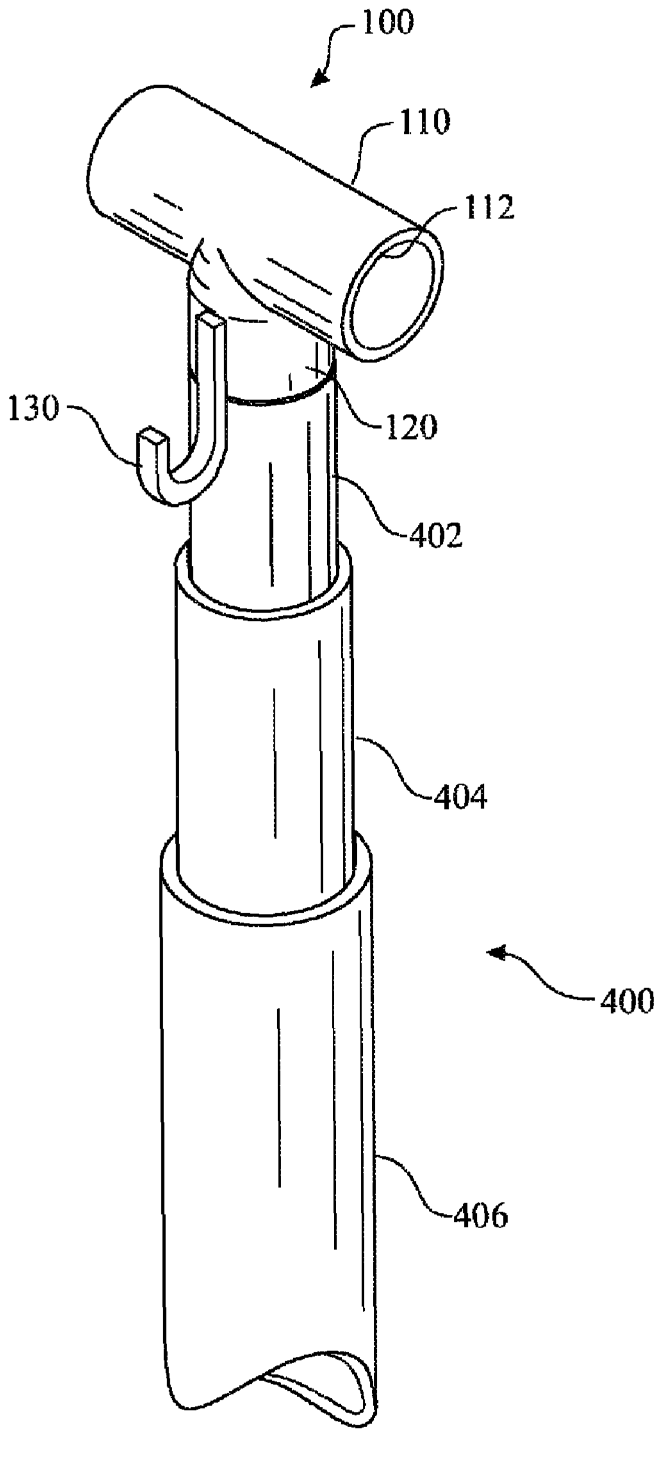
FIG. 6 presents an enhanced exemplary elongated hose holder support member introducing a telescoping configuration.

The elongated rigid support member 140 can be enhanced by utilizing a telescoping support member assembly 400, as illustrated in FIG. 6. The telescoping support member assembly 400 allows the user to vertically adjust the position of the rigid tube segment 110 to maintaining the garden hose 200 at a desired operative height. The telescoping support member assembly 400 includes a series of interleafing tubular members, including a first telescoping support member 402, which is slideably inserted into an interior of a second telescoping support member 404, which in turn is slideably inserted into an interior of each additional nth telescoping support member 406. Each of the telescoping support members 402, 404, 406 is of a length to maximize the telescoping capability of the telescoping support member assembly 400, while maintaining a desired rigidity thereof. The utility hook 130 would be designed to avoid interfering with the telescoping motion of the telescoping support member assembly 400.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method for temporarily positioning and fixing an orientation of a garden hose nozzle above a ground surface to facilitate use of running water from the hose for hand washing, the method comprising the steps:

providing a hose nozzle holder assembly, said holder assembly comprising:

an elongated rigid support member having a lower end in a form of a ground penetrating stake, and a nozzle holder engagement coupling section defined at an upper end, and a unitary T-shaped hose nozzle holder having a vertical coupling segment adapted for engagement with said elongated rigid support member, and an adjoining horizontal rigid tube segment having an interior surface defining a uniform interior diameter, said interior surface adapted for engagement with said hose nozzle, wherein said T-shaped hose nozzle holder vertical coupling segment is attached to said nozzle holder engagement coupling section;

driving said ground-penetrating stake end of said elongated rigid support member into said ground surface such that said elongated rigid support member is oriented vertically and said horizontal segment of said unitary T-shaped hose nozzle holder is oriented horizontally; and inserting said hose nozzle through said horizontal rigid tube segment such that an exterior surface of said hose nozzle remains in frictional engagement with said interior surface of said horizontal rigid tube segment, thereby maintaining said hose nozzle in an orientation horizontally, wherein, the maintenance of said hose nozzle in a fixed position enables hands-free use of discharging water.

2. A method for temporarily positioning and fixing an orientation of a garden hose nozzle as recited in claim 1, the method comprising the additional steps of:

positioning a flange end of said nozzle to abut an edge of said horizontal rigid tube segment.

3. A method for temporarily positioning and fixing an orientation of a garden hose nozzle as recited in claim 1, the method comprising the additional steps of:

providing a passage sizing tubular sleeve defined having an exterior diameter and an interior diameter, wherein said exterior diameter is designed to fictionally engage with said uniform interior diameter; and inserting said passage sizing tubular sleeve into an interior of said rigid tube segment.

4. A method for temporarily positioning and fixing an orientation of a garden hose nozzle as recited in claim 1, the method comprising the additional steps of:

providing a passage sizing tubular sleeve formed including a pliant tubular segment defined by an exterior diameter and an interior diameter and a sleeve end flange disposed at each tubular segment end; and inserting said passage sizing tubular sleeve into an interior of said rigid tube segment positioning each sleeve end flange proximate a respective end of said horizontal rigid tube segment.

5. A method for temporarily positioning and fixing an orientation of a garden hose nozzle as recited in claim 1, the method comprising the additional steps of: providing a utility hook, wherein said utility hook is integrated into said unitary T-shaped hose nozzle holder; and temporarily supporting an object by said utility hook.

6. A method for temporarily positioning and fixing an orientation of a garden hose nozzle as recited in claim 1, wherein said elongated rigid support member further comprises a telescoping body between said lower end and said upper end, the method comprising the additional step of:

adjusting a vertical position of said unitary T-shaped hose nozzle holder by extending or retracting said telescoping body.

7. A method for temporarily positioning and fixing an orientation of a garden hose nozzle above the ground to facilitate use of running water from the hose for hand washing, the method comprising the steps:

providing a hose nozzle holder assembly, said holder assembly comprising:

an elongated rigid support member being fabricated of a rigid tube length having a lower end in a form of a ground penetrating stake, and a nozzle attachment coupling section defined at an upper end by an annular upper surface joining interior and exterior tube surfaces, an upper length of said rigid tube having a uniform interior diameter, and a unitary T-shaped hose nozzle holder having a vertical coupling segment adapted for engagement with said rigid tube upper length, and an adjoining horizontal rigid tube segment having an interior surface defining a uniform interior diameter, said interior surface adapted for engagement with said hose nozzle, wherein said T-shaped hose nozzle holder vertical coupling segment is attached to said nozzle attachment coupling section;

driving said ground-penetrating stake end of said elongated rigid support member into said ground such that said elongated rigid support member is oriented vertically and said horizontal segment of said unitary T-shaped hose nozzle holder is oriented horizontally; and inserting said hose nozzle through said horizontal rigid tube segment such that an exterior surface of said hose nozzle remains in frictional engagement with said interior surface of said horizontal rigid tube segment, thereby maintaining said hose nozzle in an orientation horizontally, wherein, the maintenance of said hose nozzle in a fixed position enables hands-free use of discharging water.

8. A method for temporarily positioning and fixing an orientation of a garden hose nozzle as recited in claim 7, the method comprising the additional steps of:

positioning a flange end of said nozzle to abut an edge of said horizontal rigid tube segment.

9. A method for temporarily positioning and fixing an orientation of a garden hose nozzle as recited in claim 7, the method comprising the additional steps of:

providing a passage sizing tubular sleeve defined having an exterior diameter and an interior diameter, wherein said exterior diameter is designed to fictionally engage with said uniform interior diameter; and inserting said passage sizing tubular sleeve into an interior of said rigid tube segment.

10. A method for temporarily positioning and fixing an orientation of a garden hose nozzle as recited in claim 7, the method comprising the additional steps of:

providing a passage sizing tubular sleeve formed including a pliant tubular segment defined by an exterior diameter and an interior diameter and a sleeve end flange disposed at each tubular segment end; and inserting said passage sizing tubular sleeve into an interior of said rigid tube segment positioning each sleeve end flange proximate a respective end of said horizontal rigid tube segment.

11. A method for temporarily positioning and fixing an orientation of a garden hose nozzle as recited in claim 7, the method comprising the additional steps of:

providing a utility hook, wherein said utility hook is integrated into said unitary T-shaped hose nozzle holder; and temporarily supporting an object by said utility hook.

12. A method for temporarily positioning and fixing an orientation of a garden hose nozzle as recited in claim 7, wherein said elongated rigid support member further comprises a telescoping body between said lower end and said upper end, the method comprising the additional step of:

adjusting a vertical position of said unitary T-shaped hose nozzle holder by extending or retracting said telescoping body.

13. A method for temporarily positioning and fixing an orientation of a garden hose nozzle above the ground to facilitate use of running water from the hose for hand washing, the method comprising the steps:

providing a hose nozzle holder assembly, the holder assembly comprising:

an elongated rigid support member being fabricated of a rigid tube length having a lower end in a form of a ground penetrating stake, and a nozzle attachment coupling section located at an upper end and defined by an annular upper surface joining interior and exterior tube surfaces, an upper length of said rigid tube having a uniform interior diameter, and a unitary T-shaped hose nozzle holder having a vertical segment adapted for snug releasable engagement with said rigid tube upper length, and an adjoining horizontal rigid tube segment having an interior surface defining a uniform interior diameter, said interior surface adapted for snug releasable engagement with said hose nozzle;

coupling said unitary T-shaped hose nozzle holder vertical segment to said nozzle attachment coupling section;

driving said ground-penetrating stake end of said elongated rigid into said ground such that said elongated rigid support member is oriented vertically and said horizontal segment of said unitary T-shaped hose nozzle holder is oriented horizontally; and inserting said hose nozzle through said horizontal rigid tube segment such that an exterior surface of said hose nozzle remains in frictional engagement with said interior surface of said horizontal rigid tube segment, thereby maintaining said hose nozzle in an orientation horizontally, wherein, the maintenance of said hose nozzle in a fixed position enables hands-free use of discharging water.

14. A method for temporarily positioning and fixing an orientation of a garden hose nozzle as recited in claim 13, the method comprising the additional steps of:

positioning a flange end of said nozzle to abut an edge of said horizontal rigid tube segment.

15. A method for temporarily positioning and fixing an orientation of a garden hose nozzle as recited in claim 13, the method comprising the additional steps of:

providing a passage sizing tubular sleeve defined having an exterior diameter and an interior diameter, wherein said exterior diameter is designed to fictionally engage with said uniform interior diameter; and inserting said passage sizing tubular sleeve into an interior of said rigid tube segment.

16. A method for temporarily positioning and fixing an orientation of a garden hose nozzle as recited in claim 13, the method comprising the additional steps of:

providing a passage sizing tubular sleeve formed including a pliant tubular segment defined by an exterior diameter and an interior diameter and a sleeve end flange disposed at each tubular segment end; and inserting said passage sizing tubular sleeve into an interior of said rigid tube segment positioning each sleeve end flange proximate a respective end of said horizontal rigid tube segment.

17. A method for temporarily positioning and fixing an orientation of a garden hose nozzle as recited in claim 13, the method comprising the additional steps of:

providing a utility hook, wherein said utility hook is integrated into said unitary T-shaped hose nozzle holder; and temporarily supporting an object by said utility hook.

18. A method for temporarily positioning and fixing an orientation of a garden hose nozzle as recited in claim 13, wherein said elongated rigid support member further comprises a telescoping body between said lower end and said upper end, the method comprising the additional step of:

adjusting a vertical position of said unitary T-shaped hose nozzle holder by extending or retracting said telescoping body.

* * * * *

UNITED STATES PATENT AND TRADEMARK OFFICE

CERTIFICATE OF CORRECTION

PATENT NO. : 8,286,892 B1
APPLICATION NO. : 13/012478
DATED : October 16, 2012
INVENTOR(S) : Glen Schwanebeck It is certified that error appears in the above-identified patent and that said Letters Patent is hereby corrected as shown below:

Title page, Item (76), the portion of the inventor name reading “Schwanebek” should read --Schwanebeck--.

Signed and Sealed this
Fifteenth Day of January, 2013

David J. Kappos
*Director of the United States Patent and Trademark Office*